United States Patent
King et al.

(10) Patent No.: US 7,548,183 B2
(45) Date of Patent: Jun. 16, 2009

(54) SYSTEMS AND METHODS FOR AUTOMATICALLY DISABLING A TCAS BROADCAST

(75) Inventors: Larry D. King, Sammamish, WA (US); Ruy C. Brandao, Redmond, WA (US); Amy K. Supple, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 281 days.

(21) Appl. No.: 11/363,701

(22) Filed: Feb. 28, 2006

(65) Prior Publication Data

US 2009/0073024 A1 Mar. 19, 2009

Related U.S. Application Data

(60) Provisional application No. 60/657,809, filed on Mar. 1, 2005.

(51) Int. Cl.
*G01S 13/93* (2006.01)
(52) U.S. Cl. .............................. 342/29; 342/30; 342/36; 342/46
(58) Field of Classification Search ............. 342/29–40, 342/42–51
See application file for complete search history.

(56) References Cited

U.S. PATENT DOCUMENTS

| | | | | |
|---|---|---|---|---|
| 6,271,768 B1 * | 8/2001 | Frazier et al. | ............... | 340/961 |
| 6,459,411 B2 * | 10/2002 | Frazier et al. | ............... | 342/455 |
| 6,718,236 B1 * | 4/2004 | Hammer et al. | ................ | 701/3 |
| 6,744,396 B2 * | 6/2004 | Stone et al. | ................... | 342/36 |
| 7,363,152 B2 * | 4/2008 | Sjanic | ........................ | 701/209 |
| 7,414,566 B2 * | 8/2008 | Kaltschmidt et al. | .......... | 342/29 |
| 7,433,779 B2 * | 10/2008 | Deker et al. | ................. | 701/122 |
| 7,436,350 B1 * | 10/2008 | Maloratsky et al. | ........... | 342/30 |
| 2002/0011950 A1 * | 1/2002 | Frazier et al. | .......... | 342/357.08 |
| 2002/0063653 A1 | 5/2002 | Oey et al. | | |
| 2002/0154061 A1 * | 10/2002 | Frazier et al. | ............... | 342/455 |
| 2003/0016159 A1 * | 1/2003 | Stayton et al. | ................ | 342/30 |
| 2003/0137444 A1 * | 7/2003 | Stone et al. | ................... | 342/30 |
| 2003/0233192 A1 * | 12/2003 | Bayh et al. | ................... | 701/301 |
| 2003/0236623 A1 * | 12/2003 | Ybarra et al. | ............... | 701/301 |
| 2005/0156777 A1 * | 7/2005 | King et al. | .................... | 342/29 |
| 2007/0132638 A1 * | 6/2007 | Frazier et al. | ............... | 342/455 |
| 2008/0231493 A1 * | 9/2008 | Billaud et al. | ................. | 342/32 |
| 2008/0238758 A1 * | 10/2008 | Billaud et al. | ................. | 342/32 |

FOREIGN PATENT DOCUMENTS

WO WO 2006094067 A * 9/2006

* cited by examiner

*Primary Examiner*—John B Sotomayor

(57) ABSTRACT

Systems and methods for automatically disabling the TCAS Broadcast when aircraft join up in formation. A Traffic Collision Avoidance System (TCAS) determines if the aircraft is approaching formation flight with other aircraft or flying in formation with other aircraft and disables a TCAS interrogation signal if the aircraft is determined to be approaching a formation or flying in formation. The TCAS receives TCAS interrogation signals from one or more other aircraft and receives aircraft configuration information from one or more other aircraft systems. The TCAS determines the aircraft is approaching formation flight or flying in formation based on the received TCAS interrogation signals, a mode of TCAS operation, and/or the received aircraft configuration information. The TCAS also automatically switches into Traffic Advisory Only mode if the aircraft is determined to be approaching formation flight or flying in formation.

14 Claims, 2 Drawing Sheets

US 7,548,183 B2

SYSTEMS AND METHODS FOR AUTOMATICALLY DISABLING A TCAS BROADCAST

PRIORITY CLAIM

This application claims the benefit of U.S. Provisional Application Ser. No. 60/657,809 filed Mar. 1, 2005, which is hereby incorporated by reference.

BACKGROUND OF THE INVENTION

Traffic Collision Avoidance System (TCAS), independent of any ground inputs, performs surveillance of nearby aircraft to provide information on the position and altitude of these aircraft so collision avoidance algorithms can perform their function. TCAS surveillance operates by issuing interrogations at 1030 MHz that transponders on nearby aircraft respond to at 1090 MHz. These replies are received and decoded by a surveillance portion of TCAS software and the information is then provided to the collision avoidance algorithms.

TCAS has a requirement to provide reliable surveillance out to a range of 14 nautical miles (nmi) and in traffic densities of up to 0.3 aircraft per square nmi. The surveillance function provides the range, altitude, and bearing of nearby aircraft to the collision avoidance so threat determinations can be made and so the information displayed on the traffic display is accurate. TCAS can simultaneously track at least 30 transponder-equipped aircraft within its surveillance range.

The issue is that TCAS includes algorithms, which require it to limit the number and power of interrogations (see RTCA DO185A section 2.2.3.6.1). The limits imposed on TCAS are a function on the number of TCAS within approximately 30 nmi. The number of TCAS is detected via the UF=16 TCAS Broadcast transmission. This transmission contains the Mode S address of the TCAS aircraft and indicates that there is an operational TCAS on board the aircraft. The UF=16 TCAS Broadcast transmission is detected by Mode S transponders of other aircraft and passed on to the other aircraft's TCAS. As the number of TCAS equipped aircraft detected increases, TCAS power is decreased and receiver sensitivity is increased. In addition the algorithm attempts to determine if the distribution of TCAS within 6 nmi of own aircraft is linear in Range or linear in Area. If it is linear in range—TCAS transmit power and sensitivity can be further reduced—the assumption is that when TCAS are distributed linearly in range, the aircraft must be in close proximity to an airport and therefore—further limiting TCAS interrogation power and sensitivity is important so that TCAS does not interfere with ground radar.

However, if a military formation of several aircraft is TCAS equipped and spaced in such a manner to be distributed linearly in range from some other TCAS equipped aircraft, that other aircraft would reduce its transmission power to stay within the limits imposed by the number of TCAS in the area—and the linear range distribution.

The TCAS Broadcast transmission is not used for determining range—it is only used to communicate the Mode S address of a TCAS equipped aircraft to other TCAS equipped aircraft in the area—via the other aircraft's Mode S transponder.

Therefore, there exists a need for making sure that aircraft do not unnecessarily reduce their sensing power in the presence of aircraft flying in formation.

BRIEF SUMMARY OF THE INVENTION

The present invention provides systems and methods for automatically disabling the TCAS Broadcast when aircraft join up in formation. This invention also provides systems and methods for automatically changing the TCAS mode to "TA Only" and setting the transponder to disable replies to ground interrogations.

This invention provides methods for disabling the UF=16 TCAS broadcast of TCAS equipped military aircraft in formation so that other TCAS do not limit their interrogation range unnecessarily because of military formation which is TCAS equipped and spaced linearly in range.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
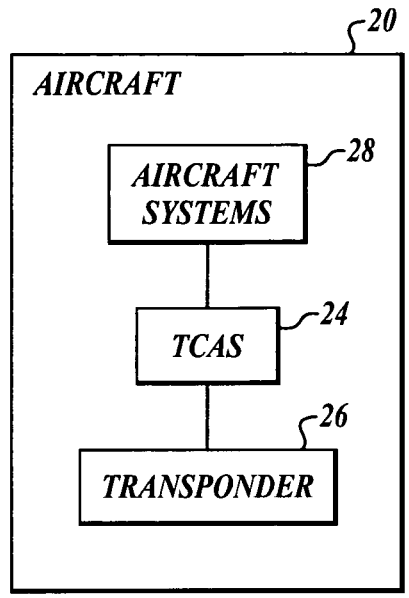
FIG. 1 illustrates a block diagram of an example system formed in accordance with an embodiment of the present invention.

FIG. 1 illustrates a block diagram of an aircraft 20 that automatically disables Traffic Collision And Avoidance System (TCAS) (interrogation—UF16) signals, if the aircraft 20 is determined to be in or approaching a formation flying situation.

The aircraft 20 includes a TCAS 24, a transponder 26, and various other aircraft systems 28. In one embodiment, the TCAS 24 receives and analyzes various aircraft configuration and other information received from the aircraft system 28 over a databus.

In one example Aircraft Configuration Data could include a list of the Mode S addresses of other formation members along with formation spacing. This Aircraft Configuration Data would be used to determine if own ship is part of a formation—in which case the UF=16 TCAS broadcast transmission would be disabled.

In another embodiment, the TCAS 24 interprets information received from other TCAS equipped aircraft that is received at the transponder 26 and TCAS 24 to determine if a formation flying situation exists. If the TCAS 24 determines that a formation flying situation exists, then the TCAS 24 disables the TCAS broadcast signal (UF=16). With the TCAS broadcast signal disabled for all the aircraft flying in formation, other aircraft would not limit their transmission power, rate, and sensitivity level more than is necessary. In one embodiment, if the aircraft 20 is the lead aircraft in the formation of aircraft, the TCAS broadcast (UF=16) is not disabled.

Figure 2:
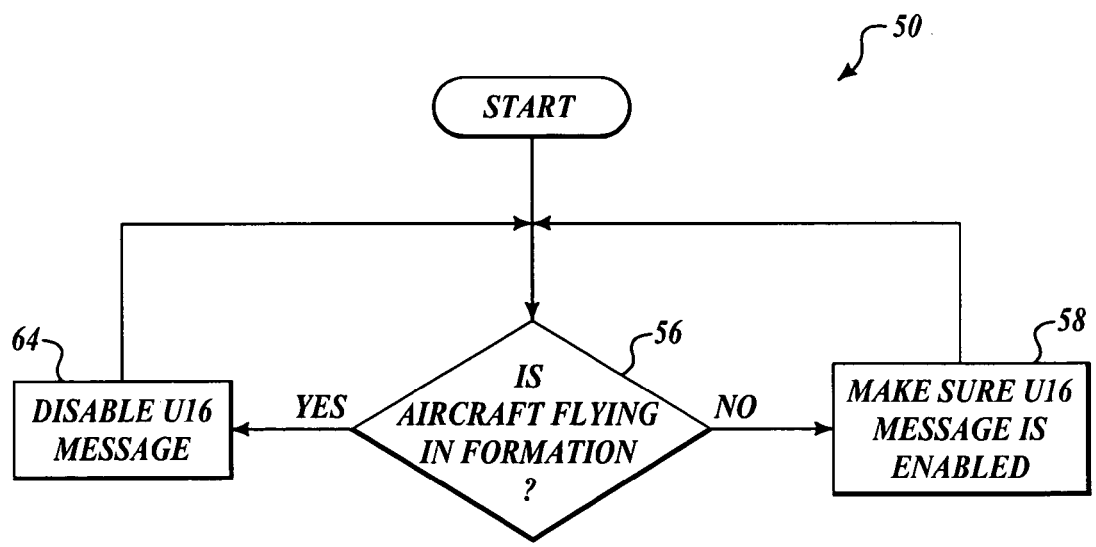
FIGS. 2 and 3 illustrate an example process performed by the system shown in FIG. 1.
Figure 3:
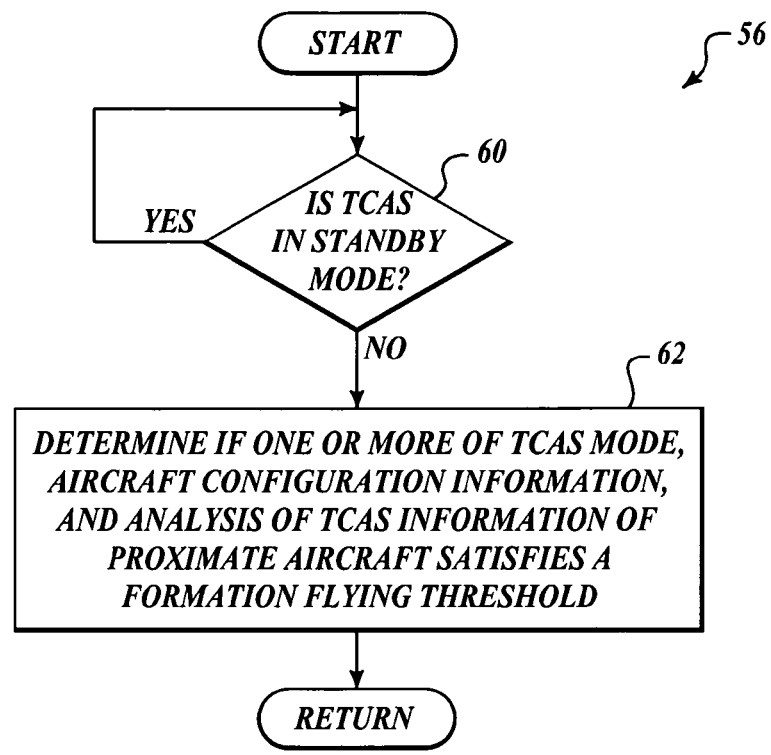

FIGS. 2 and 3 illustrate an example process 50 performed by the TCAS 24 shown in FIG. 1. The process 50 begins at a decision block 56 that determines if the aircraft 20 is flying in formation with other aircraft. If the aircraft 20 is not flying in formation with the other aircraft, then at a block 58, the TCAS 24 makes sure that the TCAS broadcast signal (UF=16) is enabled. If the TCAS 24 determines that the aircraft 20 is flying in formation, then at a block 64, the TCAS 24 disables the TCAS broadcast signal (UF=16).

FIG. 3 further describes the determination made at the block 56 of FIG. 2. First, at a decision block 60, the process 50 determines if the TCAS 24 is in standby mode. If the TCAS 24 is in standby mode, the process is effectively discontinued or put in a waiting mode until the TCAS 24 is moved out of standby mode. If it is determined that the TCAS 24 is not in standby mode, then at a block 62, the TCAS 24 determines if one or more of the TCAS mode, aircraft configuration information, and an analysis of TCAS related information satisfy a formation flying threshold. The results of the determination at block 62 is one of a "yes" the aircraft is flying in formation or "no" the aircraft is not flying in formation and the results are returned to become the output the decision block 56 from FIG. 2.

The determination performed at the block 62 of FIG. 3 may determine that the aircraft 20 is in a formation flying situation by analyzing any one of or a combination of the information provided. For example, if the flight crew switches the TCAS mode of operation to the traffic advisory (TA)-only mode and the aircraft 20 is airborne, the TCAS 24 determines that the aircraft 20 is in or approaching a formation mode of flying, because switching to the TA-only mode is a standard checklist item prior to formation flying. The TA-only mode inhibits TCAS Resolution Advisories, but not Traffic Advisories.

Formation flight may also be determined if a close-in aircraft density or formation threshold limit is reached. The close-in aircraft density or formation can be determined by analyzing the range and bearing and duration of the tracks of other near by aircraft. If the formation of aircraft aft and forward of own aircraft match that of standard military formation and own aircraft is not low to the ground (for example on approach), then the UF=16 TCAS broadcast can be inhibited. The standard military formation pattern could be pre-programmed into the unit or programmed on aircraft through an aircraft system interface.

Figure 4:
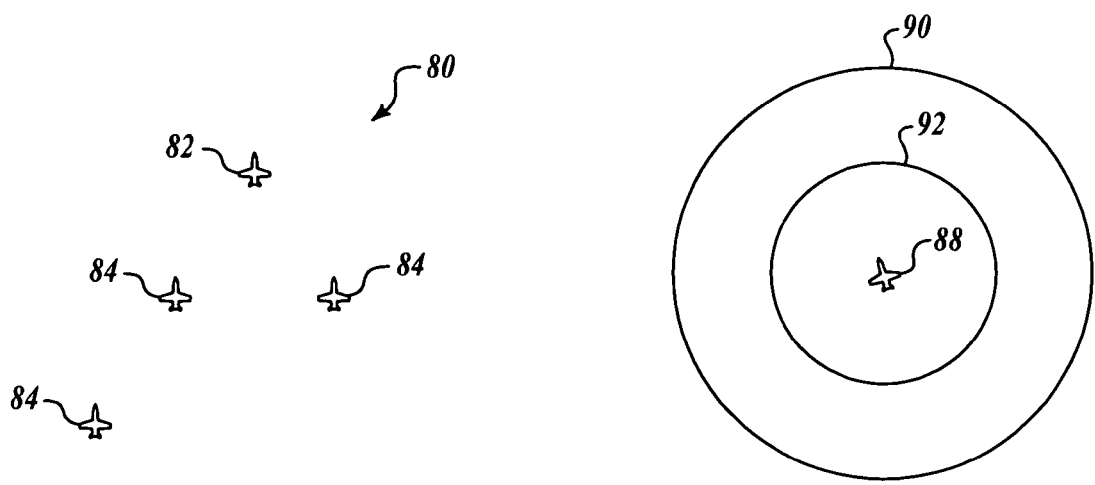
FIG. 4 illustrates a top down view of aircraft flying in an environment with aircraft that perform the functions as shown in FIGS. 2 and 3.

FIG. 4 illustrates the top-down view of a group of aircraft 80 that are flying in formation and an aircraft 88 that is not presently flying in the group of aircraft 80. The group of aircraft 80 includes a lead aircraft 82 and a plurality of wingman aircraft 84. If the aircraft 88 receives a number of TCAS broadcast signals (UF=16) that exceeds a pre-defined threshold, then the TCAS of the aircraft 88 limits its transmission power, rate, and sensitivity level more than is necessary. This could occur if each of the aircraft 82, 84 in the group of aircraft 80 transmit a distinct TCAS broadcast signal (UF=16). However, because in the present invention the aircraft 84 disable transmission of their TCAS broadcast signal (UF=16) when in formation flight, the aircraft 88 sees a lesser amount of aircraft transmitting TCAS broadcast signals (UF=16) and would not include the non-transmitting aircraft 84 as part of the determination of whether there are too many aircraft transmitting TCAS broadcast signals (UF=16). Therefore, in such a situation, the aircraft 88 would remain at a normal TCAS performance level.

In another embodiment, the TCAS 24 is automatically switched from TCAS mode to TA-Only mode when the TCAS 24 determines that the aircraft is approaching or presently flying in formation. The determination is based on aircraft configuration and/or analysis of TCAS signals received from other aircraft as described above.

In another embodiment, the TCAS 24 disables UF=16 TCAS broadcast transmissions if the crew has performed control inputs that imply it is in formation with other aircraft. This includes highlighting or selecting the aircraft it is following on the display or in other words Mode A tagging.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A Traffic Collision Avoidance System (TCAS) on board an aircraft comprising:
    a transponder for receiving TCAS interrogation signals from one or more other aircraft; and
    a processor in data communication with the transponder, the processor comprising:
        a first component for determining if the aircraft is at least one of approaching formation flight with other aircraft or flying in formation with other aircraft; and
        a second component for disabling a TCAS interrogation signal if the aircraft is determined to be approaching a formation or flying in formation.

2. The system of claim 1, wherein the first component determines the aircraft is at least one of approaching formation flight or flying in formation based on the received TCAS interrogation signals from one or more other aircraft.

3. The system of claim 2, wherein the first component determines the aircraft is at least one of approaching formation flight or flying in formation if the received TCAS interrogation signals indicate that a threshold number of in-close aircraft is exceeded.

4. The system of claim 1, wherein the first component determines if the aircraft is at least one of approaching formation flight or flying in formation based on a mode of TCAS operation.

5. The system of claim 4, wherein the mode of TCAS operation is Traffic Advisory Only mode.

6. The system of claim 1, wherein the first component determines if the aircraft is at least one of approaching formation flight or flying in formation based on configuration of the aircraft.

7. The system of claim 1, wherein the first component determines if the aircraft is at least one of approaching formation flight or flying in formation based on one or more of the received TCAS interrogation signals from one or more other aircraft, a mode of TCAS operation, or a configuration of the aircraft.

8. A method performed by a Traffic Collision Avoidance System (TCAS) on board an aircraft, the method comprising:
    determining if the aircraft is at least one of approaching formation flight with other aircraft or flying in formation with other aircraft; and
    a second component for disabling a TCAS interrogation signal if the aircraft is determined to be approaching a formation or flying in formation.

9. The method of claim 8, further comprising:
    receiving TCAS interrogation signals from one or more other aircraft,
    wherein determining is based on the received TCAS interrogation signals.

10. The method of claim 9, wherein determining includes determining the aircraft is at least one of approaching formation flight or flying in formation if the received TCAS interrogation signals indicate that a threshold number of in-close aircraft is exceeded.

11. The method of claim 8, wherein determining includes determining the aircraft is at least one of approaching formation flight or flying in formation based on a mode of TCAS operation.

12. The method of claim 11, wherein the mode of TCAS operation is Traffic Advisory only mode.

13. The method of claim 8, further comprising:
receiving aircraft configuration information from one or more other aircraft systems,
wherein determining includes determining the aircraft is at least one of approaching formation flight or flying in formation based on the received aircraft configuration information.

14. The method of claim 8, further comprising:
receiving TCAS interrogation signals from one or more other aircraft; and
receiving aircraft configuration information from one or more other aircraft systems,
wherein determining includes determining the aircraft is at least one of approaching formation flight or flying in formation based on one or more of the received TCAS interrogation signals, a mode of TCAS operation, or the received aircraft configuration information.

* * * * *

UNITED STATES PATENT AND TRADEMARK OFFICE
CERTIFICATE OF CORRECTION

PATENT NO. : 7,548,183 B2  Page 1 of 1
APPLICATION NO. : 11/363701
DATED : June 16, 2009
INVENTOR(S) : King et al.

It is certified that error appears in the above-identified patent and that said Letters Patent is hereby corrected as shown below:

On page 4, line 20 after the word aircraft; delete the word "and".

On page 4, line 23 at the end of the sentence ending with flying in formation; add
--and
a third component for switching the TCAS into Traffic Advisory Only mode if the
first component determines the aircraft is at least one of approaching formation
flight or flying in formation.--.

On page 4, lines 53 and 54 delete the words "and a second component for".

On page 4, line 56 at the end of the line add the words --and
automatically switching the TCAS into Traffic Advisory Only mode if the aircraft is determined to be
at least one of approaching formation flight or flying in formation.--.

Signed and Sealed this

Ninth Day of March, 2010

David J. Kappos
*Director of the United States Patent and Trademark Office*